United States Patent [19]
Davidson et al.

[11] Patent Number: 5,841,855
[45] Date of Patent: *Nov. 24, 1998

[54] MENU LEVEL INDICATOR FOR A TELEPHONE TERMINAL

[75] Inventors: Joanne W. Davidson, Keansburg; William F. Dudley, Jr., Jackson, both of N.J.; David M. Gresham, East Hampton, N.Y.; Michael L. Moroze, Broomfield, Colo.; Elizabeth Bauer-Nilsen Sanders, Columbus, Ohio; Alessandro A. Subrizi, San Francisco, Calif.; Susan L. Tuttle, East Windsor, N.J.

[73] Assignee: Lucent Technologies Inc., Murray Hill, N.J.

[*] Notice: The term of this patent shall not extend beyond the expiration date of Pat. No. 5,774,540.

[21] Appl. No.: 559,516

[22] Filed: Nov. 15, 1995

(Under 37 CFR 1.47)

[51] Int. Cl.⁶ .............................. H04M 1/00; H04M 3/42
[52] U.S. Cl. ...................... 379/387; 379/93.17; 379/142; 379/201; 379/396; 345/33; 345/55; 345/902
[58] Field of Search .............................. 379/96, 354, 396, 379/142, 201, 202, 122, 93.23, 93.17, 387; 345/33, 50, 55, 901, 902, 156

[56] References Cited

U.S. PATENT DOCUMENTS

| | | | |
|---|---|---|---|
| 4,481,382 | 11/1984 | Villa-Real | 455/556 |
| 5,097,528 | 3/1992 | Gursahaney et al. | 379/201 |
| 5,327,486 | 7/1994 | Wolff et al. | 379/93.23 |
| 5,349,629 | 9/1994 | Kumano | 455/564 |
| 5,371,788 | 12/1994 | Baals et al. | 379/396 |
| 5,373,551 | 12/1994 | Baals et al. | 379/457 |
| 5,386,460 | 1/1995 | Boakes et al. | 345/902 |
| 5,412,713 | 5/1995 | Baals et al. | 379/96 |
| 5,436,954 | 7/1995 | Nishiyama et al. | 455/566 |
| 5,479,476 | 12/1995 | Finke-Anlauff | 379/58 |
| 5,486,843 | 1/1996 | Otting et al. | 345/35 |
| 5,487,104 | 1/1996 | Baals et al. | 379/96 |
| 5,526,422 | 6/1996 | Keen | 379/396 |
| 5,552,806 | 9/1996 | Lenchik | 345/156 |
| 5,559,945 | 9/1996 | Beaudet et al. | 395/156 |
| 5,621,789 | 4/1997 | McCalmont et al. | 379/93.17 |
| 5,629,733 | 5/1997 | Youman et al. | 345/902 |
| 5,642,410 | 6/1997 | Walsh et al. | 379/201 |
| 5,655,014 | 8/1997 | Walsh et al. | 379/201 |
| 5,657,378 | 8/1997 | Haddock et al. | 379/93.23 |

*Primary Examiner*—Scott Wolinsky
*Attorney, Agent, or Firm*—Samuel R. Williamson; Gregory C. Ranieri

[57] ABSTRACT

A menu level indicator facilitates ease of use of a telephone terminal by a user by providing easily understandable information about selectable menu options available in an interactive display on the telephone terminal. The menu level indicator provides a visual indication for permitting the user to directly determine the number of menu options available while at one of multiple selectable menu levels in the menu. The menu level indicator also provides a visual indication for the user as to the relative position of a displayed, selectable menu option with respect to other selectable menu options commonly located at one of the multiple selectable menu levels. As a user maneuvers through the menu levels, such user is able to quickly develop a mental model of the feature menus and easily navigate through these menu selections.

20 Claims, 5 Drawing Sheets

MENU LEVEL INDICATOR FOR A TELEPHONE TERMINAL

BACKGROUND OF THE INVENTION

1. Technical Field

This invention is directed to telephone terminals and, more particularly, a telephone terminal configurable for accessing features available on the terminal through an interactive display arrangement.

2. Description of the Prior Art

With the advent of numerous features now available at many telephone terminals, displays having selectable menu options are being commonly employed to aid users in accessing the features associated with these options. The display technology presently employed in most telephone displays today is character-based liquid crystal device (LCD) displays. These displays are configured in various array sizes such as, for example, a 2-line by 10-character LCD display and a 3-line by 12-character LCD display. In order to be aesthetically pleasing when incorporated into a telephone housing, these displays tend to be small, typically on the order of one inch in height. Also, in order to provide a reasonable number of characters for information such as caller-ID information and directory access information, a small font size for the characters is generally used.

Many interactive display arrangements available today include a menu interface which permits accessing the features available on the display through both large ring menus and command key sequences, and then performing tasks associated with these features. Examples of telephone terminals whose features are accessible through ring menus and also command key sequences are the AT&T 3730 and the AT&T 3760 cellular telephone terminals commercially available from AT&T and also the Models 800 and 900 cellular telephone terminals available from OKI.

In order to provide a high level of functionally with a sufficient level of clarity in the telephone displays, many label screen prompts have heretofore been provided for accessing the numerous features. Although these screen prompts do improve somewhat the ease with which one uses the display, the basic requirement of having to move more than a few screens in the menu hierarchy to access different features often tends to be confusing and is considered undesirable for many users of the telephone terminal. Moreover, often the most unambiguous label for a particular screen prompt is not available for use in the display because the number of characters in the label is incompatible with the limited character space available in the display for such label. This has caused the wireless industry to use the entire screen as a feature label, thus tending to confuse the user by not providing queues as to where the user has moved to within the menu interface.

SUMMARY OF THE INVENTION

The prior art problems are solved in accordance with the present invention through use of a menu level indicator through which information about a number of and a selectable one of menu options are provided in an interactive display for a user of a telephone terminal.

In accordance with a first aspect of the disclosed invention, the menu level indicator provides a visual indication for permitting the user to directly determine the number of menu options available while at one of multiple selectable menu levels in the menu. The menu level indicator consists of, by way of example, a linear array of like symbols aligned in a section of the display. Each symbol corresponds to an available menu option selectable by a user while at one of the multiple selectable menu levels.

In accordance with a second aspect of the disclosed invention, the menu level indicator provides a visual indication for the user as to the relative position of a displayed, selectable menu option with respect to other selectable menu options commonly located at one of the multiple selectable menu levels. As the user maneuvers through the menu levels, the number of symbols that appear in the interactive display advantageously changes in accordance with the number of available menu options for a selected menu level. The user is thereby able to quickly develop a mental model of the feature choices and easily navigate through these menu selections.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
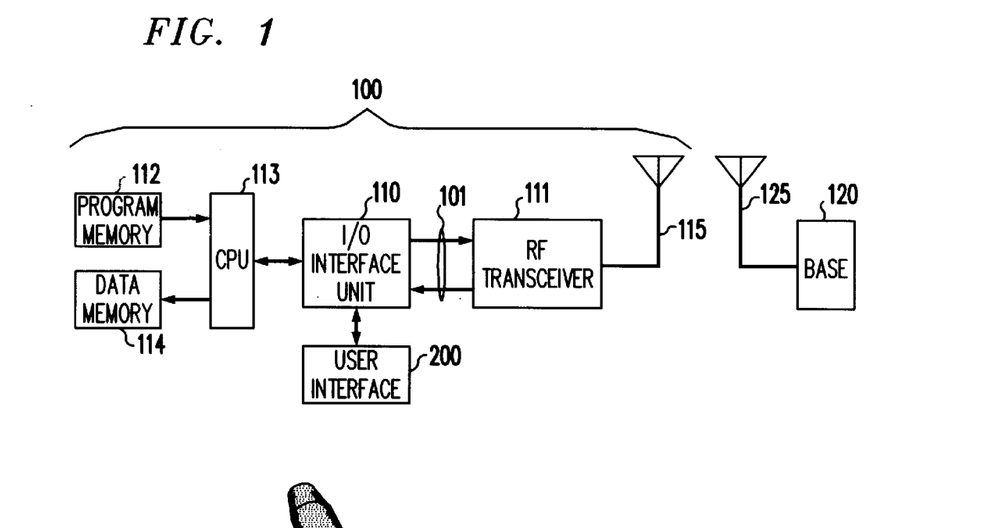
FIG. 1 is a block diagram of a wireless telephone terminal and a base unit, the telephone terminal being usable for incorporating the present invention.

Referring now to FIG. 1, there is shown an illustrative block diagram of a wireless telephone terminal 100 useful for describing the operation of the present invention. The terminal includes an input/output (I/O) interface unit 110 which connects via lines 101 to a radio frequency (RF) transceiver 111 containing a transmitter and receiver for providing communications in, by way of illustrative example, a cellular radio system.

Various types of cellular radio systems are known in the art and have been otherwise described. Once such system is described in *The Bell System Technical Journal,* Volume 58, January 1979, Number 1, particularly in papers entitled "Advanced Mobile Phone Service: Introduction, Background and Objectives" by W. R. Young and "The Cellular Concept" by V. H. MacDonald.

The RF transceiver 111 may also provide communications suitable for operating in a cordless telephone system. Such a cordless telephone system is described in U.S. Pat. No. 4,706,274 and 5,044,010, for example.

This I/O interface unit 110 contains switching and control circuits required by the terminal 100 for establishing, maintaining and terminating RF communications connections between terminal 100 and base unit 120. Through these circuits and via antennas 115 and 125, the terminal 100 thus sends to and receives the appropriate signals from the base unit via the RF transceiver 111.

The terminal 100 also includes a program memory 112 which provides instructions to a central processor unit (CPU) 113 for controlling the various operating features and functions originating at the terminal. This program memory 112 contains data for interpreting a plurality of codes representative of various control signals received from the base unit 120 and for generating codes to be transmitted to the base unit 120. A data memory 114 is utilized by the CPU 113 for storing and accessing data associated with performing the various functions and features programmed in the program memory 112. In the described embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
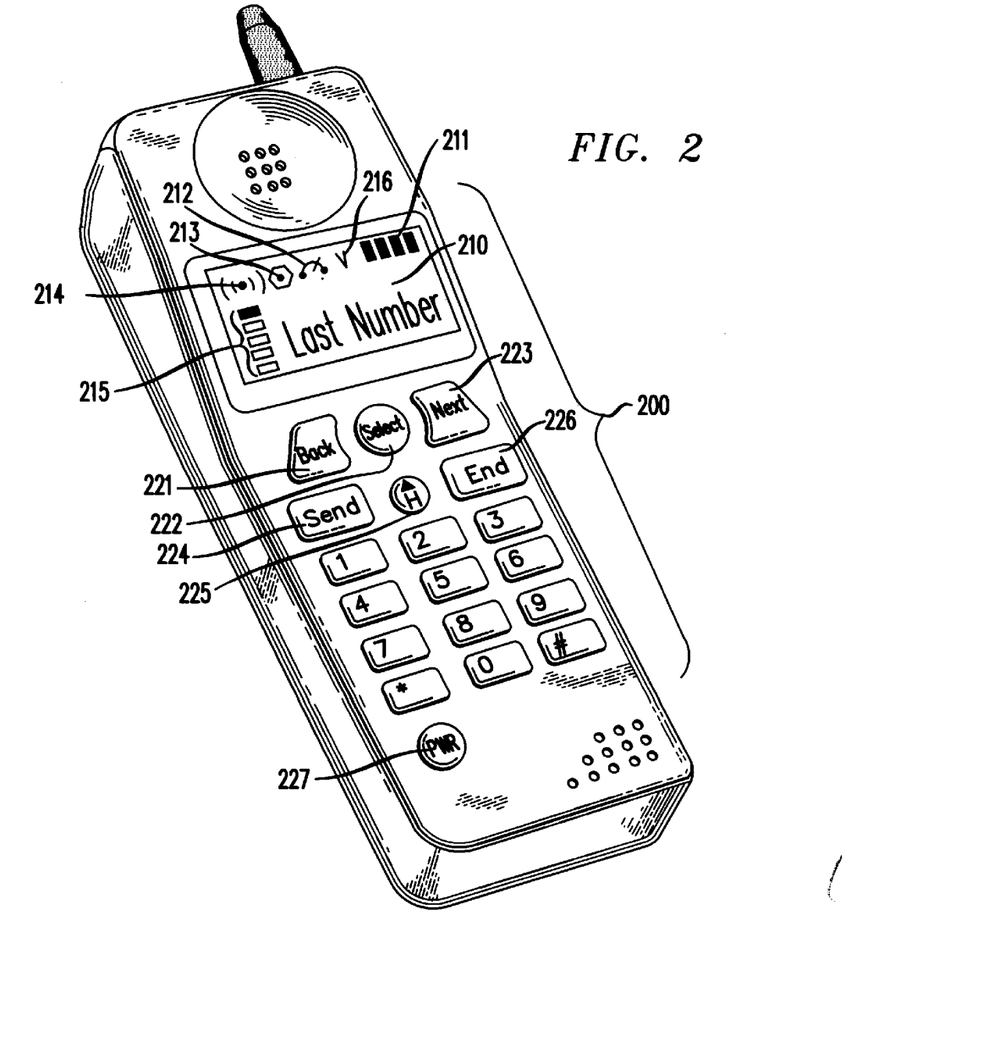
FIG. 2 illustrates the telephone terminal of FIG. 1 including a user interactive display displaying a first menu screen accessible in accordance with the present invention.

With reference now to FIG. 2, the user interface 200 comprises a user interactive display 210 which includes a number of screen display symbols. Such screen display symbols include a battery level symbol 211, an on-call/no-service symbol 212, a system indicator 213, a signal strength symbol 214, and a voice mail waiting symbol 216.

The battery level symbol 211 consists of five battery icons or symbols for showing the battery power level. At full charge, all symbols are filled in. As the battery loses power, the filled-in part of each one of the symbols is removed leaving the symbol outline. When only one filled-in symbol remains, it is an indication to the user to recharge the battery. The on-call/no-service symbol 212 is displayed when a telephone call is in progress. The handset with a diagonal slash appears in this service symbol when telephone service is not available. The system indicator 213 shows the type of system that the telephone terminal 100 is being used in. For example, in a cellular system, an "A" or "B" symbol is displayed. The signal strength symbol 214 provides an indication of the received signal strength. This symbol is largest when the received signal is strong and becomes smaller as the received signal becomes weaker. The voice mail waiting symbol 216 appears when the user has a voice mail message waiting.

The user interactive display 210 also includes, in accordance with the disclosed embodiment, a menu level indicator 215. This menu level indicator includes a number of identical or like symbols comprising rectangularly outlined boxes aligned in a column on a side of the screen display. Menu options and other information, to be described later herein, are provided by the one or more filled-in rectangular boxes. When a menu option is being displayed on the menu screen, only one rectangular box is filled in for reflecting that option. The menu level indicator 215 informs a user as to how many menu options are available by displaying a corresponding number of vertically aligned rectangular boxes. The menu level indicator 215 also informs a user just which one of the menu options is currently active by darkening or filling in the one rectangular box associated with that menu screen option.

Also shown in the user interface 200 is a set of menu keys or buttons which provides quick access to all of the features of the telephone terminal with just a few key presses of these menu keys. The menu keys include a "Back" key 221, a "Select" key 222, a "Next" key 223 and a "Home" key 225. Other well-known keys or buttons: a "Send" key 224, an "End" key 226 and a "Power" key 227, as well as others illustrated in the form of a dial pad, are also part of the telephone terminal shown in FIG. 2 but are conventional keys and need not be described in detail herein.

The Back key 221 allows a user to back up menu screen by menu screen. The Select key 222 selects the feature which is being displayed on the bottom line of the screen. The Next key 223 allows a user to go forward menu screen by menu screen. The Send key 224 and the End key 226 are conventional keys which, in a cellular system, are used to respectively send a just-entered or stored telephone number to a base unit and to terminate an established conversation. The Home key 225 is used to return a user to the original starting screen in the plurality of display screens. The Power key 227 provides operating power to the telephone terminal in a conventional manner.

The screen display changes dynamically as the user performs functions and makes selections via the Select key 222. Shown in the display 210 is just one menu screen in the hierarchically arranged menu. The illustrated entry is that of the original starting screen or the "Last Number" dialed which is conveniently provided for a user whenever the telephone terminal is turned ON from an OFF state or returned to its standby state after the user presses the End key 226, terminating a telephone call.

Figure 3:
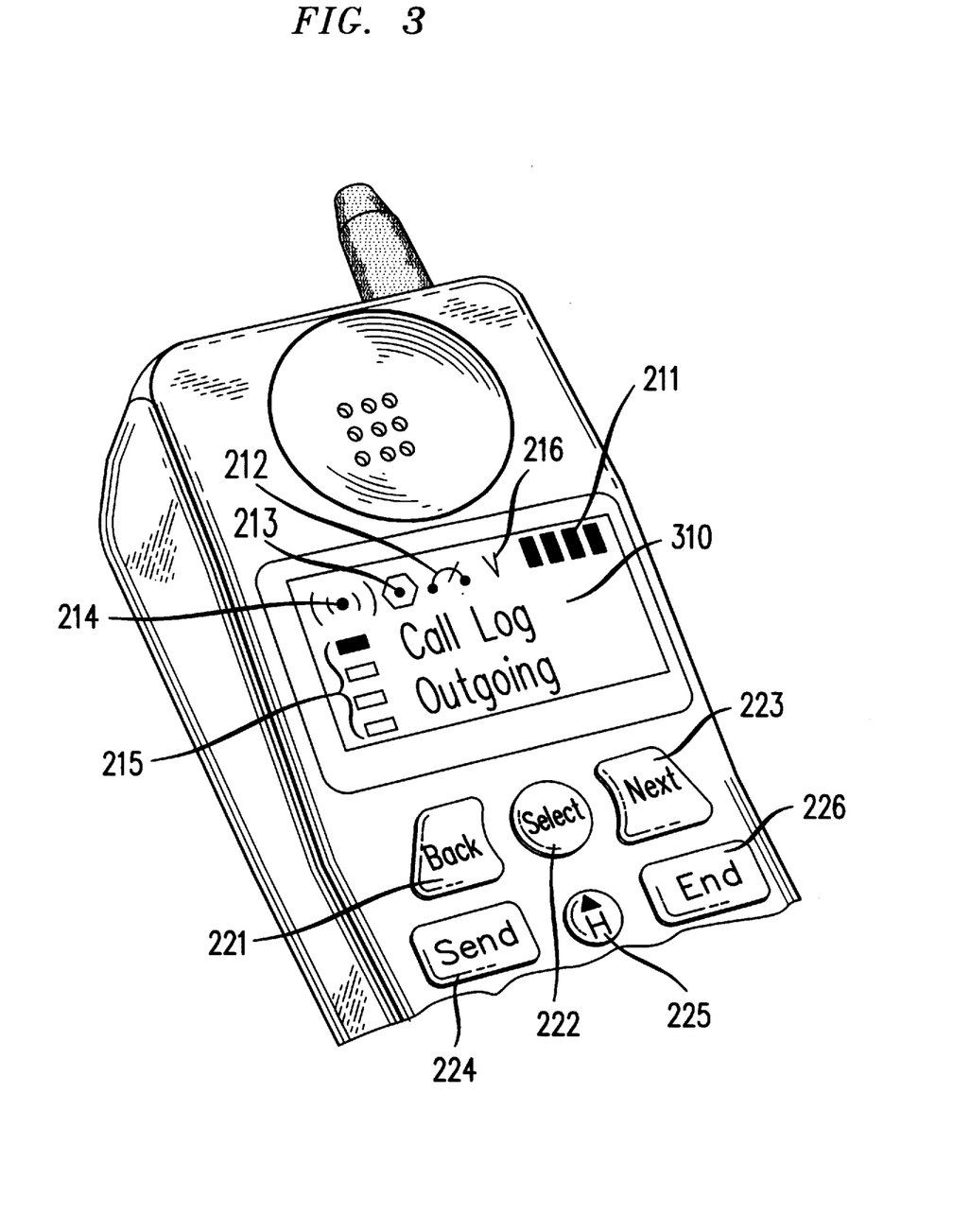
FIG. 3 illustrates the telephone terminal of FIG. 1 including a user interactive display displaying a second menu screen accessible in accordance with the present invention.

With reference next to FIG. 3, there is shown portions of the user interface 200, shown in FIG. 1, including screen display symbols 211 through 215 provided in a screen display 310. This "Call Log Outgoing" screen shown in display 310 is described in detail later herein and with reference to FIG. 6.

While the embodiment of the present invention is illustratively described as incorporated into a wireless telephone terminal, it should be recognized that the present command-operated terminal could be utilized in other program-controlled systems such as wired telephone terminals. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2; the display screens shown in FIGS. 2 and 3; and the display screen flow diagrams of FIGS. 4 through 7 which, taken together, describe the logical steps and the various parameters required to implement the present invention.

Figure 4:
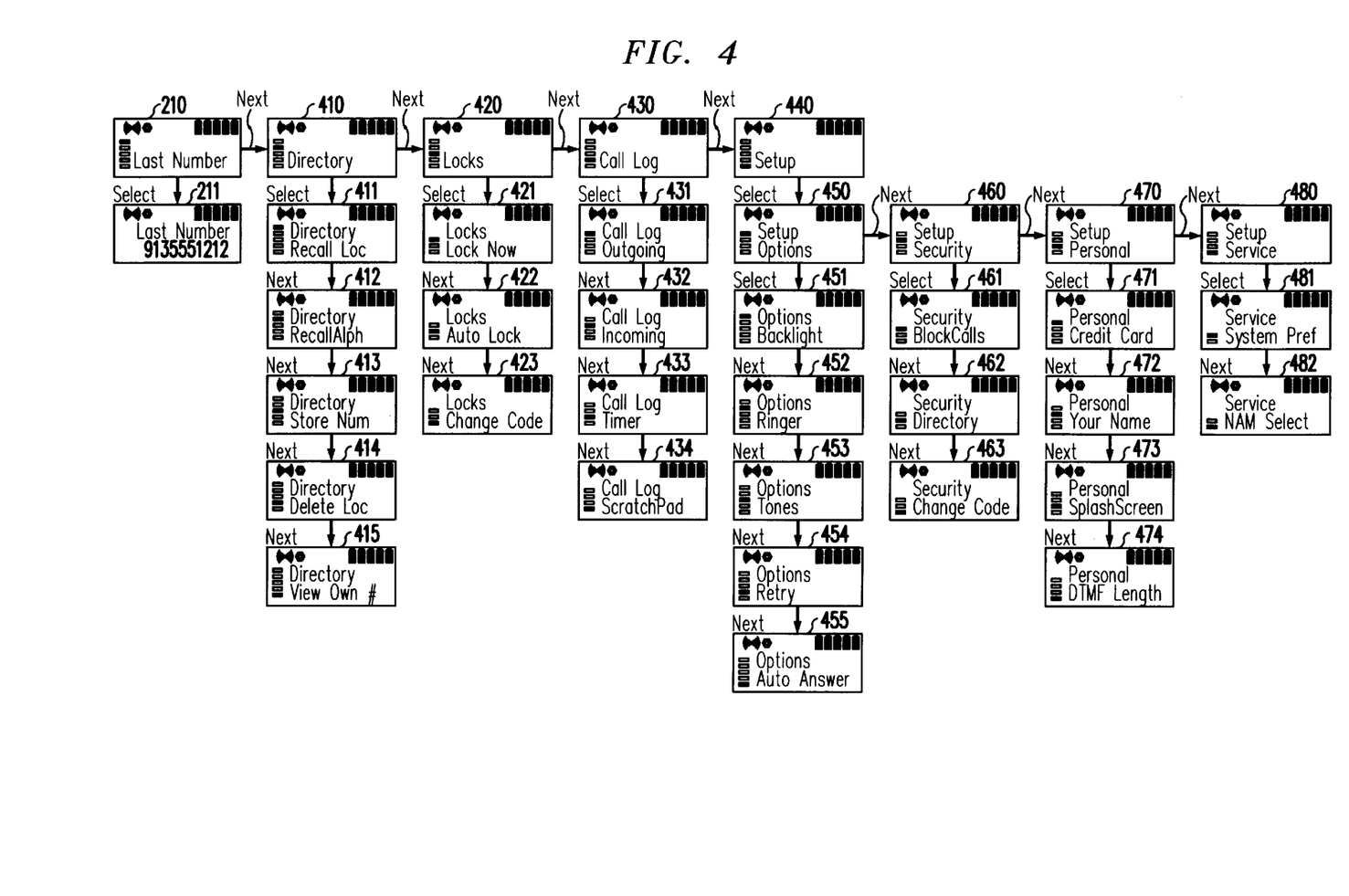
FIG. 4 is a flow chart illustrating some of the display screens provided by the circuitry shown in FIG. 1 and produced in an interactive display shown in FIGS. 2 and 3 in accordance with the invention.

Referring next to FIG. 4, there is shown a flow chart for illustrating some of the display screens provided by the circuitry in FIG. 1 and produced in the interactive display in the same manner as illustratively shown in display 210 in FIG. 2 and display 310 in FIG. 3. The sequence in which these display screens are provided is indicated by the flow chart, and is shown in sufficient detail to permit one skilled in the art to duplicate the circuitry of FIG. 1, either by programming a microprocessor or by special purpose logic circuitry such as is available in a digital signal processor.

When the telephone terminal 100 is turned ON from an OFF state, the menu feature option, i.e., screen label Last Number, as shown in display 210 in both FIG. 1 and FIG. 4, appears in the display on the bottom line and the menu level indicator shows the outlines of five vertically aligned symbols or rectangular boxes with the outline of the top box being shaded or filled in. The user of the telephone terminal is thus informed when viewing the menu level indicator that the current display in the terminal is the top choice of a 5-choice menu. As easily understood with reference to FIG. 4, the Next key allows the user to move sideways through these equal-level menu choices, and the menu level indicator allows the user to determine which one of the menu choices is currently being viewed.

As the user repeatedly presses the Next key 223, shown in FIG. 2, the menu choice changes from Last number as shown in display 210 to "Directory" as shown in display 410; then to "Locks" as shown in display 420; next to "Call Log" as shown in display 430; and finally to "Setup" as shown in display 440. As each choice is viewed, a corresponding one of the vertically aligned array of rectangular boxes is filled in to allow the user to determine just where he or she is while navigating within the menu. By way of illustrative examples, for the Directory display 410, the second rectangular box from the top is filled in; for the Locks display 420, the third rectangular box from the top is filled in; for the Call Log display 430, the fourth rectangular box from the top is filled in; and finally, for the Setup display 440, the fifth rectangular box from the top is filled in. An additional press of the Next key 223 returns the user to the top Last Number display 210, and once again the top rectangular box in the vertical aligned array of rectangular boxes is filled in.

Each one of the equal level menu choices represented by menu screen displays 210, 410, 420, 430 and 440 provide a number of selectable optional screens that may be selected by the user of the telephone terminal 100. Once the user of the telephone terminal has decided which menu choice he or she wishes to explore, the Next key is used to place that choice on the bottom line of the display and the Select key 222 is pressed. By way of examples, first, by pressing the Select key 222, while at the display 210, the user selects the last number dialed and this number is shown in the display 211. Second, when the user presses the Select key 222 while at the display 410, the Directory displays 411 through 415 are selected. Third, when the user presses the Select key 222 while at the display 420, the Locks displays 421 through 423 are selected for display. Fourth, when the user presses the Select key 222 while at the display 430, the Call Log displays 431 through 434 are selected for display. Finally, when the user presses the Select key 222 while at the display 440, the Setup displays 450 through 455, 460 through 463, 470 through 474 and 480 through 482 can be accessed.

When the user specifically selects the setup option as a menu choice, the display is configured at the top choice of a 4-choice menu, which includes displays 450, 460, 470 and 480. And the menu level indicator allows the user to determine which one of the menu choices is currently being viewed. In this operative example, as the user repeatedly presses the Next key 223, the display moves sideways through these equal-level menu choices and the viewed menu choice changes from "Setup Options" as shown in display 450 to "Setup Security" as shown in display 460; then to "Setup Personal" as shown in display 470; and finally to "Setup Service" as shown in display 480. As each choice is entered, the menu level indicator allows the user to determine which one of the menu choices is currently being viewed by displaying a filled-in one of four vertically aligned rectangular boxes.

Figure 5:
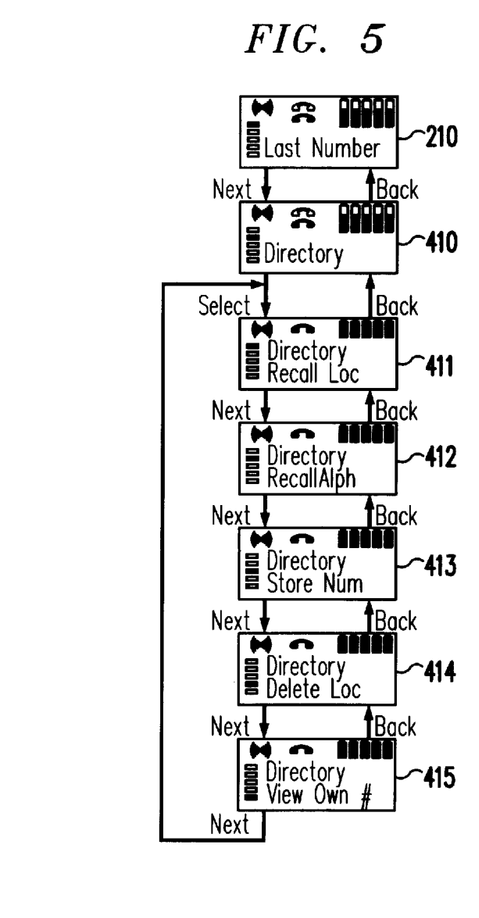
FIGS. 5 through 7 are flow charts illustrating some of the display screens provided by the circuitry shown in FIG. 1 and also illustrating how movement between these display screens is achieved, in accordance with the invention.

Referring next to FIG. 5, there is shown the steps that a user of the telephone terminal 100 takes in moving from the Last Number display 210 to the Directory display 410, selecting this display and then moving among the sub-displays 411 through 415 in this menu choice. Sequentially pressing the Next key while at either of displays 411 through 415 causes the terminal to cycle between these five displays and the display level indicator informs the user which one of the menu choices is being viewed by filling in a particular one of five vertically aligned rectangular boxes that are respectively associated with these menu choices.

FIG. 5 also shows the use of the Back key 221 and how a user, while at either of displays 411 through 415, is able to back up in each of these displays, to the Directory display 410 and on to the Last Number display 210. Just as the operation invoked by a user in pressing the Next key 223 is reflected in one of the vertically aligned rectangular boxes being filled in, the operation of the display through the Back key 221 also causes the appropriate one of of the vertically aligned rectangular boxes to be filled in.

Other sub-menu options are available from the main feature menu choices. They are logically grouped together and therefore advantageously related to the main menu choices. A user is thereby able to quickly develop a mental model of the feature menu choices and easily navigate through these menu selections.

Figure 6:
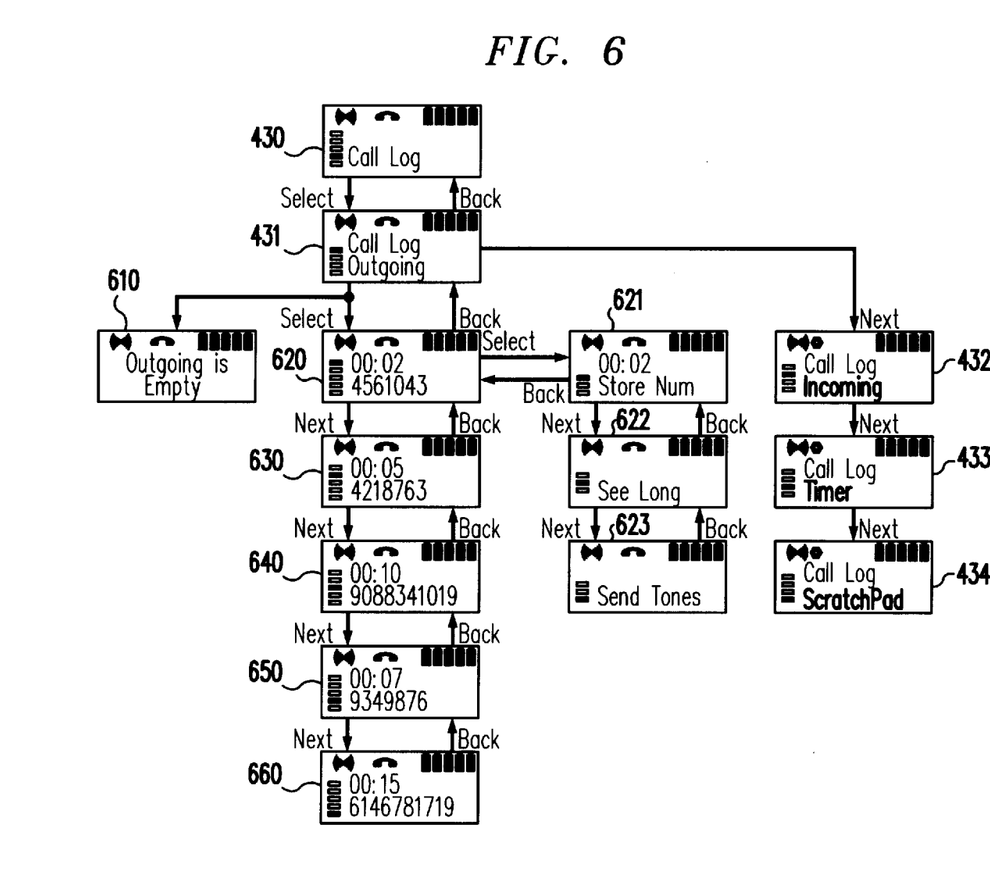

With reference to FIG. 6, there is shown an example of sub-menu or additional menu options available from the Call Log feature menu. In using the Call Log feature, the user presses the Next key, as earlier described herein, and while at this display 430, presses the Select key 222. The process then advances to the Call Log Outgoing display 431. At this display, the menu level indicator reflects through four vertically aligned rectangular boxes the four equal-level menu choices with the top rectangular box being filled in to show that the user is at the beginning of the Call Log. Just as described earlier herein, the Next key also is used to view the other Call Log menu choices, i.e., displays 432, 433 and 434, and the menu level indicator assists the user in determining which one of the menu choices is being displayed.

If the Call Log Outgoing menu choice is selected by the user, the menu level indicator shows the total number of entries in the Call Log and also the position of the entry being viewed by a user. To enter the outgoing Call Log menu choice, the user presses the Select key when the Outgoing option for Call Log is displayed on the bottom of the display. When the Select key is pressed, if the outgoing Call Log is empty, the process moves to display 610 and displays the message "Outgoing is Empty."

If there are entries in the Outgoing Call Log, however, the menu level indicator changes to reflect the number of entries in the outgoing Call Log. In the illustrated example, there are five entries in the outgoing Call Log, and the top one of the five vertically aligned rectangular boxes is filled in to inform the user that he or she is at the beginning of the outgoing Call Log menu choices or display 620. Although five calls are stored in the Call Log, as illustrated in displays 620 through 660, if a fewer number of calls have been made, the number of displays will reflect this fewer number of calls then stored in the Call Log. Similarly, the number of boxes in each display, like the number of displays, will reflect the number of calls then stored in the Call Log. Thus, the number of boxes in this context also are dynamic to show the actual number of entries in the outgoing Call Log.

For any number being viewed in the Call Log, the user can press the Select key for additional options that can be applied to that number, as shown in, for example, displays 621 through 623. As each one of these displays is selected with the Next key, the menu level indicator will reflect not only the number of options but also the selected one of the options. Thus, in this 3-choice menu, the Next key can be used to advance to any of the three feature displays, i.e., store number 621, See Long 622, and Send Tones 623; and the appropriate one of the three vertically aligned rectangular boxes is filled in as the user views these choices.

Figure 7:
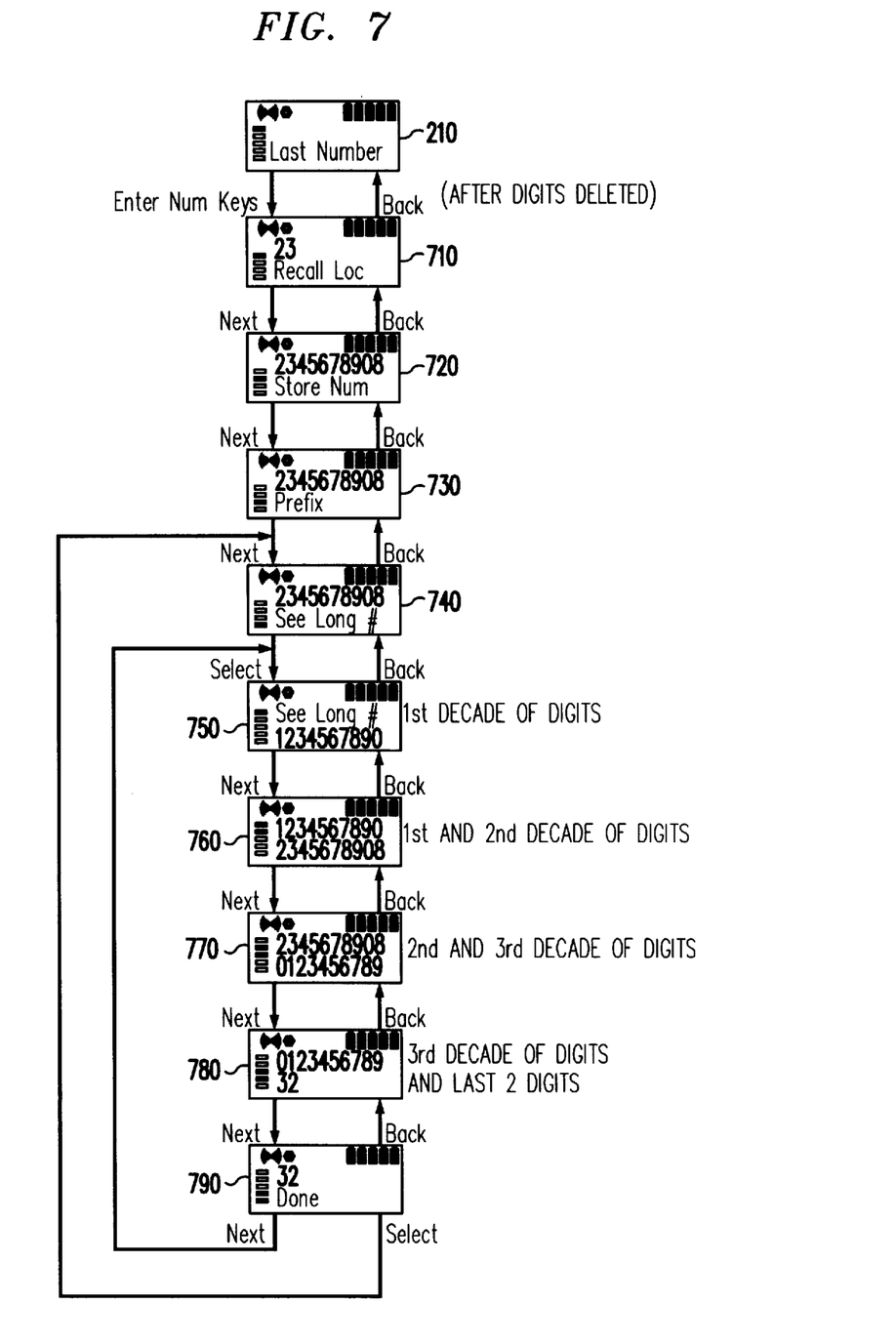

Referring now to FIG. 7, there is shown an additional usage of the menu level indicator, in accordance with the disclosed embodiment. Occasionally, a user has the need to enter or view a telephone number longer than the available number of digits on a single line of the display. The display in the disclosed embodiment herein permits a user to view, for example, only ten digits on a line. In order to permit the user to view a number having many more digits, a feature which employs the menu level indicator symbols and a second available line in the display is incorporated into the telephone terminal 100.

In the operation of this feature, and with reference to FIG. 7, a user may enter a number that is up to 32 digits long and then store this number by pressing the Select Key 222. While the telephone terminal is showing the menu option Last Number as shown in display 210 of FIG. 7, a user enters the digits of the desired number. After the first two digits are entered, the process assumes that the user is attempting to recall a location in which a telephone number may be stored and presents the user with the screen choice "Recall Loc" shown in display 710. As additional digits are entered, the process then assumes that the user is storing a telephone number and presents the user with the screen prompt "Store Num" shown in display 720. After all digits are entered, the user may either store the number by pressing the Select key 222 or add a prefix such as an area code by pressing the Next key 223 to move to the display 730. Also, if the user would like to confirm that a long number was entered correctly, then pressing the Next key once more selects the "See Long #" display 740.

To initiate the See long # feature, the user presses the Select key while display 740 appears in the terminal. Once the Select key is pressed, when the user specifically selects the See Long # option as a menu choice, the display is configured at the top choice of a 5-choice menu, which includes displays 750, 760, 770, 780 and 790. And the menu level indicator is reconfigured in this operation in order to allow the user to determine which decade or combination of decades of digits of the number is currently being viewed.

In this operative example, while viewing the display 750, the user is able to observe the first decade of digits being displayed on the lower row of the display. In its reconfigured application, the menu level indicator also shows that the first decade of digits is being displayed by having the upper one of the five rectangular boxes filled in. As the user presses the Next key, the first decade of digits moves to the top one of two rows and a second decade of digits is displayed in the bottom row. Similarly, in the menu level indicator, the first rectangular box remains filled in and the second rectangular box from the top is also filled in to reflect the displaying of the first and second decades of digits, as shown in display 760. An additional press of the Next key causes the second decade of digits to move to the top one of the two rows and a third decade of digits is displayed in the bottom row. At this display screen 770, the first rectangular box is no longer filled in and the second and third rectangular boxes from the top of this indicator are filled in for reflecting that the second and third decade of digits are being displayed. Another press of the Next key causes the third decade of digits to move to the top one of the two rows and any remaining digits are displayed in the bottom row. At this display screen 780, the first and second rectangular boxes are no longer filled in, and the third and fourth rectangular boxes from the top of this indicator are filled in for reflecting that the third decade of digits and any remaining digits in the number are being displayed. Yet another press of the Next key causes any remaining digits to move to the top one of the two rows and the word "Done" to be displayed in the bottom row for providing an indication that all digits have been displayed. At this display screen 790, the first, second and third rectangular boxes are no longer filled in, and the fourth and fifth rectangular boxes from the top of this indicator are filled in for reflecting that the last of any remaining digits in the number are being displayed in the top row of the display. The word Done appears in the display, not only to give the user an easy means of exiting this feature, but also as a way of letting the user know that he or she is viewing the end of the number.

This See Long # feature also automatically sizes the number of displays to be shown based on the digits in the number. If, for example, a number were only 18 digits long, only three screen displays would be necessary to show the entire long number. Accordingly, only three rectangular boxes would be provided for showing these 18 digits with the first two boxes illustrating that numbers are in the first and second decades and the third box appearing to reflect that all decades of digits have been shown. In addition, in the third screen display in this example, the word Done would also appear on the bottom row of the display.

What has been described is merely illustrative of the present invention. Other applications to telephone, computer or other user-interactive systems other than the disclosed system are contemplated as being within the knowledge of one skilled in the art and may be utilized without departing from the spirit and scope of the present invention.

We claim:

1. An arrangement for configuring a telephone terminal for identifying selectable features displayable at the terminal, the arrangement comprising:

means for displaying on a display screen a plurality of symbols having a substantially identical shape wherein the number of symbols is indicative of a total number of selectable features available for display at each one of a plurality of selectable levels in the telephone terminal; and means for identifying which one in the total number of selectable features is being displayed at each one of the plurality of selectable levels, and for identifying which one of said selectable levels is being displayed.

2. The arrangement of claim 1 wherein the plurality of symbols is arranged in a linear array.

3. The arrangement of claim 2 wherein said linear array comprises a vertically aligned array of boxes.

4. The arrangement of claim 2 wherein each symbol in the linear array represents one feature within the number of selectable features available for display at each selectable level.

5. The arrangement of claim 4 wherein the configuring means, responsive to said identifying means, distinctively configures a first and a second symbol in the linear array for representing a level of displayed information in a displayed one of the selectable features.

6. The arrangement of claim 4 wherein the configuring means, responsive to said identifying means, distinctively configures one symbol in the linear array for representing a displayed one of the selectable features.

7. The arrangement of claim 6 wherein said linear array includes outlines of an array of boxes and said distinctively configured symbol is a shaded-in box within the array of boxes.

8. The arrangement of claim 7 wherein said array of boxes are vertically aligned.

9. The arrangement of claim 8 wherein said array of boxes are rectangular in shape.

10. An arrangement for configuring a telephone terminal for identifying selectable features displayable at the terminal, the arrangement comprising:

a display screen on the telephone terminal; and means for displaying a plurality of symbols having a substantially identical shape on said display screen indicative of a number of selectable features available for display while said display screen is at one of a plurality of selectable levels in said telephone terminal, said display screen containing an indication of one of a plurality of selectable features of said telephone terminal available at each one of the plurality of selectable levels, and the plurality of symbols providing an indication of the total number of selectable levels and an indication of which of said selectable levels is being displayed.

11. The arrangement of claim 10 wherein the plurality of symbols is arranged in a linear array.

12. The arrangement of claim 11 wherein each symbol in the linear array represents one feature within the number of selectable features available for display at each selectable level.

13. The arrangement of claim 12 further including configuring means for distinctively configuring one symbol in the linear array for representing a displayed one of the selectable features.

14. The arrangement of claim 13 wherein said linear array includes outlines of an array of boxes and said distinctively configured symbol is a shaded-in box within the array of boxes.

15. A method of configuring a telephone terminal for identifying selectable features displayable at the terminal, the method comprising the steps of:

displying on a display screen a plurality of substantially identically shaped symbols indicative of a total number of selectable features available for display at each one of a plurality of selectable levels in the telephone terminal; and identifying which one in the total number of selectable features is being displayed at each one of said plurality of selectable levels, and identifying which one of said selectable levels is being displayed.

16. The method of claim 15 wherein the plurality of symbols is arranged in a linear array.

17. The method of claim 15 wherein each symbol in the linear array represents one feature within the number of selectable features available for display at each selectable level.

18. The method of claim 17 further including the step of distinctively configuring one symbol in the linear array for representing a displayed one of the selectable features.

19. The method of claim 18 wherein said linear array includes outlines of an array of boxes and said distinctively configured symbol is a shaded-in box within the array of boxes.

20. A method of configuring a telephone terminal for identifying selectable features displayable at the terminal, the method comprising the steps of:

providing a display screen on the telephone terminal; and displaying a plurality of substantially identically shaped symbols on said display screen indicative of a number of selectable features available for display while said display screen is at one of a plurality of selectable levels in said telephone terminal, said display screen containing an indication of one of a plurality of selectable features of said telephone terminal available at each one of the plurality of selectable levels, and the plurality of symbols providing an indication of the total number of selectable levels and an indication of which of said selectable levels is being displayed.

* * * * *